June 4, 1929.　　　T. A. BANNING, JR　　　1,715,735
PUMPING AND METERING APPARATUS
Filed Oct. 13, 1926　　　2 Sheets-Sheet 1

Inventor:
Thomas A. Banning
by Thos. A. Banning
Atty.

June 4, 1929.  T. A. BANNING, JR  1,715,735
PUMPING AND METERING APPARATUS
Filed Oct. 13, 1926  2 Sheets-Sheet 2

Inventor
Thomas A. Banning Jr
By Thos. A. Banning Jr Atty.

Patented June 4, 1929.

1,715,735

UNITED STATES PATENT OFFICE.

THOMAS A. BANNING, JR., OF WILMETTE, ILLINOIS.

PUMPING AND METERING APPARATUS.

Application filed October 13, 1926. Serial No. 141,308.

This invention has to do with improvements in pumping and metering apparatus. It has to do particularly with apparatus of the foregoing type which is intended for pumping and metering of fuels, such as gasoline, naphtha, oil, etc.; but it will presently appear that the features of the invention are not limited to the foregoing or any other particular classes of service. Nevertheless, in view of the fact that said features have been devised with a view to the particular requirements of this class of service and such liquids, I have illustrated and will describe the invention with such uses particularly in mind. In doing so, however, I wish it distinctly understood that I do not intend to limit myself to devices for the foregoing work except as I may do so in the claims.

One of the objects of the invention is to provide a means for pumping of liquid and at the same time accurately metering said liquid so that the total amount pumped through the apparatus will be indicated at all times. In this connection it is a further object to make provision for integrating the metering action so that the total quantity of liquid pumped can be ascertained from time to time.

A further object of the invention is to make provision for accurate calibration of the device so that it will give a correct reading and will correctly measure the liquid pumped. In this connection it is an object to provide a very simple and effective calibration means whereby the quantity of liquid displaced per revolution or per unit of movement can be adjusted in a very simple and effective manner.

A further object of the invention is to provide displacement cylinders in the form of collapsible chambers made of flexible material whereby the alternate expansion and collapse of said cylinders will cause the pumping action to be performed.

In connection with the foregoing it is a further object to make the collapsible displacement cylinders of flexible metal so that the necessary alternate changes of size may be readily performed and with the consumption of a minimum amount of power. At the same time the use of metal chambers will avoid any possible deleterious action due to the nature of the liquid being handled.

A further object of the invention is to provide a construction in which the movement of the liquid being pumped is from bottom to top, entering through bottom inlet check valves and being delivered through top discharge check valves. In this way the tendency will always be for the device to clear itself of entrained or entrapped air, thereby ensuring a steady delivery of a solid stream of liquid. Furthermore, this arrangement will result in a very prompt elimination of air from the system at the time that the pump is first started up or after the liquid has been exhausted and again replenished.

A further object is to secure the foregoing system of pumping within a mechanism in which use is made of displacement cylinders, there being an inlet check valve at the bottom of each said cylinders and a discharge check valve at its upper end, the system being a uniflow system.

Another feature of the invention relates to the provision of a structure in which the liquid discharged from the upper ends of the displacement cylinders is first caught or trapped within a chamber surrounding said cylinders, from which chamber the liquid is then delivered to the discharge passage. In this way the use of any flexible connections between the different chambers and the discharge passage is eliminated and corresponding advantages are secured.

A further object of the invention is to actuate the displacement cylinders by the use of a tilting member operating on a ball and socket joint and which member is actuated with a gyratory tilting movement. The calibration of the device for the purpose of securing accurate adjustment of the pumping action per revolution is secured by variation of the size of the cone on which this member is tilted.

A further object in connection with the foregoing is to locate the ball and socket joint entirely within a separately sealed chamber isolated from the liquid being pumped. This isolated chamber may be filled with suitable lubricant such as oil or grease, and being inaccessible to the liquid being pumped said lubricant will last indefinitely. This is a very desirable feature when it is remembered that liquids such as gasoline and naphtha are themselves nonlubricating and are ready solvents of such lubricants as oil and grease.

A further object of the invention is to make provision for driving the pumping device by the use of a small electric motor or the like to which the current is supplied from any suitable source.

Other objects and uses of the invention will appear from a detailed description of the same which consists in the features of construction and combinations of parts hereinafter described and claimed.

Figure 1:
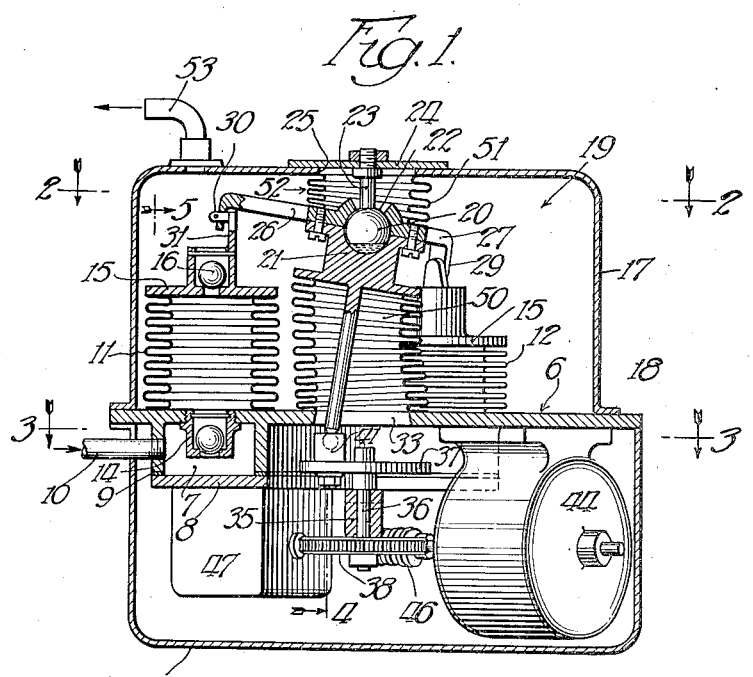
Figure 1 shows a vertical section through a pumping device embodying the features of the present invention, the same being shown substantially full scale for use on an automobile, truck, tractor or other similar vehicle.
Figure 3:
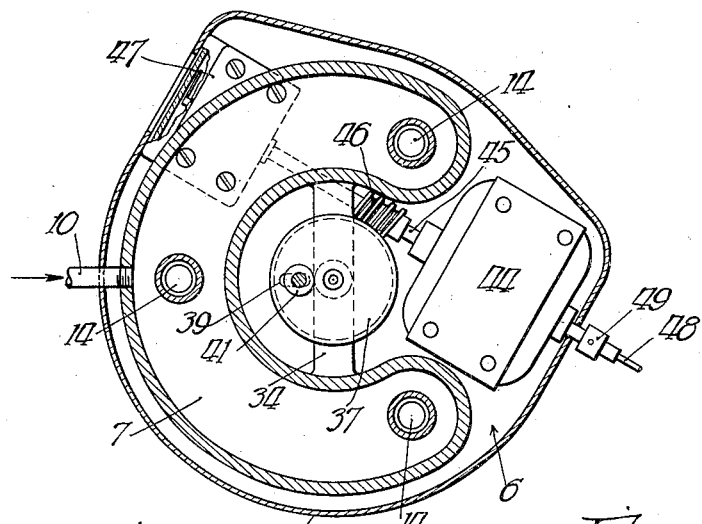
Fig. 3 shows a horizontal section on the line 3—3 of Fig. 1 looking in the direction of the arrows.

The device illustrated includes a base plate 6, preferably in the form of a die casting, having a curved or horseshoe shaped inlet passage 7 on its bottom face. Said passage is preferably closed by a bottom plate 8, and if desired a suitable gasket 9 may be used in order to ensure a perfectly tight seal. The incoming liquid reaches the passage 7 through the supply pipe 10 as shown in Figs. 1 and 3.

Secured to the top face of the base plate 6 is a series, preferably three, of collapsible chambers 11, 12 and 13, respectively. These chambers preferably take the form of bellows of very thin sheet metal such as sheet copper, the same being deeply corrugated, as illustrated in Fig. 1 in particular. Such bellows are readily procurable in large quantities and of a high degree of perfection and of great flexibility.

Figure 2:
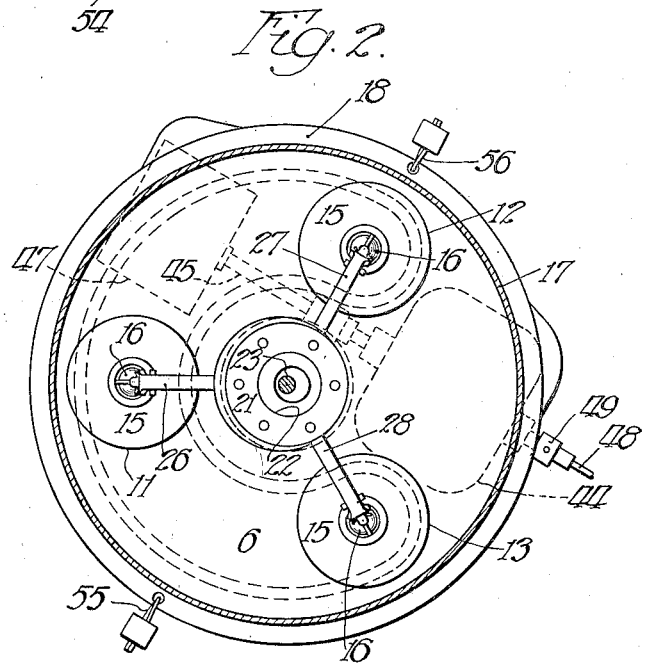
Fig. 2 shows a horizontal section on the line 2—2 of Fig. 1 looking in the direction of the arrows.

The lower ends of these chambers are preferably brazed or soldered to the top face of the base plate 6 at equidistant points located 120 degrees apart, as illustrated in Fig. 2.

An inlet check valve 14 reaches through the base plate 6 at the position of each chamber so as to allow the inlet of liquid to the chamber from the passage 7. These inlet check valves are preferably in the form of small ball check valves as well shown in Fig. 1. They may be threaded up from the passage 7 into the base plate 6, this result being readily permitted prior to setting the plate 8 in place.

Figure 5:
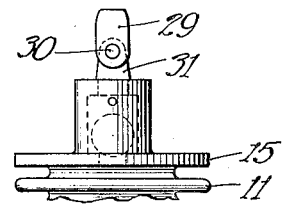
Fig. 5 shows a fragmentary vertical section on the line 5 of Fig. 1 looking in the direction of the arrow and on enlarged scale.

The tops of the respective chambers are closed by plates 15, as shown particularly in Figs. 1 and 5. Each of these plates has a ball discharge check valve 16 on its top face so that as the chamber is collapsed the liquid may overflow past said discharge check valve and occupy the space surrounding the collapsible chamber. These plates 15 are preferably secured to the top ends of the chambers by brazing, soldering or other similar process.

A spun or drawn sheet metal cup 17 is set over the chambers and has its lower edge 18 secured to the base plate 6 in liquid tight manner. There is thus established a chamber 19 above the base plate 6 and within which the various collapsible chambers are located and operate.

A ball 20 is placed within the chamber 19 and upon the same is swivelly mounted a rocking member 21, including companion upper and lower sections establishing a ball and socket joint with the ball 20 between them. The upper member of this ball and socket joint has an opening 22 of sufficient size to receive the stem 23 upon which the ball 20 is mounted, and at the same time allow a desired amount of rocking or tilting movement. The stem 23 may be secured either directly to the cup 17 or to a small plate 24 which seals a central opening 25 in the top of the cup. The latter arrangement is illustrated and is preferred for reasons which will presently appear.

The member 20 is provided with radial arms 26, 27 and 28 corresponding to the three chambers; and the outer ends of said arms are turned down as shown in Figs. 1 and 5 and are provided with lugs 29. These lugs receive pins 30 which reach outward from lugs 31 on the top plates 15, the connections being so established as to provide the necessary amount of flexibility at this point. By means of this arrangement the member 21 may be rocked with a gyratory or tilting movement on the ball and socket joint. As it does so its arms 26, 27 and 28 will also rock or gyrate, thereby moving the upper ends of the chambers up and down with a movement wherein the pins 30 travel in circular paths. Such movement is possible because of the flexibility of the chambers and at the same time the chambers are alternately expanded and contracted so as to produce the desired pumping action.

The gyratory movement of the member 21 is performed without rotation. A central stem 32 reaches downwardly from the member 21 and through a central hole 33 in the base plate 6. This hole 33 is of sufficient size to allow the stem 32 to gyrate with the maximum desired movement.

Figure 4:
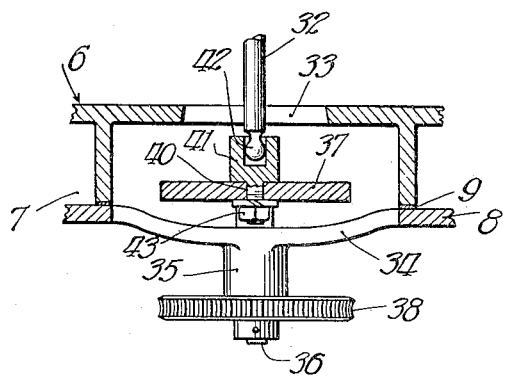
Fig. 4 shows a fragmentary vertical section on the line 4 of Fig. 1 looking in the direction of the arrow and on enlarged scale.

The plate 8 already referred to has a cross or bridge piece 34 which establishes a bearing 35 for a short stub shaft 36. The upper end of this stub shaft carries a small disk 37 and the lower end of the stub shaft carries a worm gear 38. The disk 37 has a radial slot 39 which receives a pin 40 on an adjustment block 41 (see Figs. 1 and 4 in particular). This block 41 has in its top face a socket which receives the ball 42 on the lower end of the stem 32. A nut 43 serves as a convenient means for locking the block 41 in any desired position of radial adjustment within the limits of the slot 39.

As the worm gear 38 is rotated, thereby rotating the disk 37, the lower end of the stem 32 is forced to travel in a circular path, thereby gyrating the member 21 and causing the different chambers to alternately and successively pass through their pumping movements. The amount of up and down movement of the chambers is dictated by the size of the path of travel of the stem 32 and this in turn is adjustable by setting the block 41 in and out along the slot 39.

A small electric motor 44 is suspended from the bottom of the base plate 6. It has a shaft 45 which carries the worm 46 driving the worm gear for the above purpose.

A suitable counting device 47 may be placed in line with the shaft 45 and directly driven thereby so as to operate said counting device in proportion to the number of motor revolutions. This in turn is in proportion to the number of pumping cycles and by proper adjustment of the block 41 the device can be calibrated so as to read accurately in gallons or other units of liquid quantity in the counting device 47:

If desired a flexible wire shaft 48 may be connected to the motor shaft 45 by a small block 49, said shaft 48 reaching to another counting device located on the dashboard of the automobile.

A bellows 50 is placed between the member 21 and the top face of the base plate 6. The upper and lower ends of said bellows are connected respectively to the block 21 and to the base plate 6. This bellows serves to close the chamber 19 and prevent the flow of pumped liquid down through the opening 33. It is also preferred to place a small bellows 51 between the member 21 and the bottom face of the top of the cup 17 and around the opening 25 so as to establish a small sealed chamber 52 around the position of the ball and socket joint already referred to. This chamber 52 when established may be filled with oil or other lubricant and, being entirely isolated from the chamber 19, the ball and socket joint will continue to operate under perfect lubrication for an indefinite length of time and without contact from the liquid pumped, such as gasoline, naphtha, etc.

A delivery pipe 53 is connected to the top of the cup 17 so as to take off the liquid from the chamber 19.

Assuming that the device is functioning properly and that all air has been eliminated from the collapsible chambers and from the chamber 19, a solid stream of liquid will be pumped from the pipe 53. If this pipe is shut off, as for example when the carburetor of the engine is not taking any liquid therefrom, a back pressure is created within the chamber 19 and this back pressure will become sufficient to stall the motor 44. This motor is purposely made of such characteristics as to be capable of standing idle for an indefinite length of time but with full voltage applied thereto, without overheating or other damage.

As soon as the carburetor takes liquid from the pipe 53 the motor will cause the member 21 to gyrate and thus cause the chambers to pump at a rate just sufficient to supply the liquid needed to keep up the stream and maintain the pressure desired. It is possible to design the motor 44 of such characteristics as to maintain a substantially constant pressure of the delivered liquid at different rates of flow, or to even cause an increase of liquid pressure as the rate of flow increases.

It will be noted that during the discharge stroke or collapsing of each chamber the pressure existing within the same is substantially the same as the pressure on the discharge side, since said pressure is the pressure existing within the chamber 19 and around the outsides of the chambers. Consequently on the down or discharge stroke the only pressure necessary to be delivered to the chamber is that needed to collapse it against the flexibility of the metal itself. On the contrary, on the upstroke the resistance which must be overcome is that due to the difference in pressure existing between the inlet passage 7 and the chamber 19. It is thus evident that the pumping work is performed during the inlet or suction strokes of the chambers and that on the discharge strokes the only liquid resistance to be overcome is that necessary to move the liquid past the check valves.

If desired a drawn or spun sheet metal cup 54 may be placed under the motor and counting device and associated parts, the upper edge of said cup being also secured to the base plate 6. In this way the two cups 17 and 54 together serve to effectively enclose the different working parts.

If desired also the cups may be sealed to the base plate 6 by the use of small seals 55 and 56 so to prevent the device being opened up by unauthorized persons. In this way it will be possible to calibrate the device and bring it to a condition where it accurately measures the liquid pumped so as to give a correct indication on the counting device 47, and then the device can be sealed or closed against tampering.

It will be noted that I have provided three collapsible chambers which are located uniformly around the central axis of the device, and that these chambers are moved up and down in regular timed relationship, since they are located 120 degrees apart. Furthermore, these chambers are moved up and down with a substantially sinusoidal movement since the eccentricity occasioned by the rocking of the arms 26, 27 and 28 is very small. Analysis will show that with this arrangement there will be such overlaps of delivery from the several chambers that together they will give a substantially uniform delivery of liquid during the entire rotation of the driving shaft 36, and therefore there will be a constant and uniform rate of delivery into the space around the chambers as long as the driving of the shaft is constant. Another way of looking at the matter is that the rate of rotation of the driving shaft 36 will always be exactly proportional to the rate of delivery of liquid from the group of chambers considered as a group, and thus the rate of rotation and the rate of delivery will always be equal, regardless of the angular position of the shaft at any time.

Inasmuch as the space around the chambers is enclosed by the cup 17 and the delivery pipe 53 connects into the top thereof it follows that when rotation of the shaft commences the liquid first displaced will displace the air from the top of the device, which air will be delivered out of the connection 53, and when all of the air has been displaced delivery of liquid will commence, and will continue as long as the pumping action continues and there is a demand for liquid. Since the chamber 17 is of constant size, and since the rate of liquid delivery from the group of chambers is proportional to the rate of shaft rotation, it follows that it is possible to have the rate of shaft rotation at all times proportional to the rate of delivery of liquid from the chamber established by the cup. Such an arrangement of parts is new in the present case as far as I am aware.

While I have herein shown and described only a single embodiment of the features of my present invention, still it will be understood that I do not intend to limit myself to the same except as I may do so in the claims.

This application as to certain features of invention herein disclosed is a continuation in part of my co-pending application for Letters Patent of the United States on improvements in fuel feeding and metering systems and apparatus, Serial No. 728,209, which was filed July 25, 1924, and patented June 7, 1927, as No. 1,631,356.

I claim:

1. In a liquid displacement apparatus the combination of a base plate, an arcuate downwardly facing inlet channel on the bottom thereof, a bottom plate enclosing said channel on its bottom side, a plurality of collapsible chambers above the base plate and having their lower ends sealed thereto above the position of the channel aforesaid, an inlet check valve in the base plate between the channel and the lower end of each of said chambers, a cover plate on the top end of each chamber having a discharge check valve therein, a cup above the base plate and enclosing the chambers and having its lower edge sealed to the base plate to establish a discharge chamber thereabove, a ball downwardly depending from the center of said cup, a tilting member mounted on said ball with a ball and socket joint, connections between said member and the plates covering over the upper ends of the chambers aforesaid, there being a central opening in the base plate, a central stem downwardly depending from the tilting member through said opening, a bellows between the tilting member and the base plate around the opening serving to seal the discharge chamber from the opening, a bellows between the tilting member and the lower face of the cup serving to seal the ball and socket joint from the discharge chamber, suitable lubricant within the last named bellows and around the ball and socket joint, a discharge connection from the upper portion of the cup aforesaid, and means for driving the downwardly depending stem with a gyratory movement, substantially as described.

2. In a liquid displacement apparatus the combination of a base plate, an inlet passage beneath the same, a plurality of collapsible chambers above the base plate and having their lower ends secured to the base plate above the position of said inlet passage, inlet check valves between the inlet passage and the lower ends of the chambers, cover plates enclosing the upper ends of the chambers, discharge check valves in said cover plates, a cup above the base plate and surrounding the chambers and having its lower end sealed to the base plate to thereby establish a discharge chamber above the base plate and around the chambers, a central tilting member located in the upper portion of the discharge chamber, a ball and socket joint between said tilting member and the cup aforesaid, driving connections between the tilting member and the cover plates above the chambers, there being a central opening in the base plate, a downwardly depending stem on the tilting member reaching through said opening, a bellows between the tilting member and the base plate surrounding said opening and stem and serving to seal the discharge chamber from said opening, a discharge connection from the cup aforesaid, and means for driving the tilting member with a gyratory movement comprising a rotary member below the position of the base plate and means for rotating the same on an axis substantially intersecting the center of gyration, substantially as described.

3. In a liquid displacement apparatus the combination of a base plate, an inlet passage in conjunction with the same, a plurality of collapsible chambers above the inlet passage and having the lower ends sealed to the base plate, an inlet check valve between the inlet passage and the lower end of each chamber, a cover plate for the upper end of each chamber, a discharge check valve in each cover plate, a cup above the base plate and around the chambers and having its lower end sealed to the base plate to thereby establish a discharge chamber around the chambers and above the base plate, a tilting member within said discharge chamber, a ball and socket joint between said tilting member and a stationary part, there being a central opening in the base plate, a downwardly depending stem on the tilting member reaching through said opening, a bellows between the tilting member and the base plate and surrounding the stem and opening to thereby seal the discharge chamber from said opening, and means for driving said stem in a gyratory movement, substantially as described.

4. In a liquid displacement apparatus the combination of means for establishing a closed chamber having a floor, a plurality of collapsible chambers within said chamber having their lower ends secured to said floor, there being an inlet passage in the floor below the lower ends of the chambers, an inlet check valve between said passage and the lower end of each chamber, means for closing the upper ends of the chambers, discharge check valves in said closing means, permitting discharge of displaced liquid from the chambers into the space around the chambers and within the discharge chamber, a connection from the upper portion of the discharge chamber, a tilting member within the discharge chamber, means for establishing a ball and socket joint between the tilting member and a stationary part, connections between the tilting member and the upper portions of all the chambers, there being a central opening in the floor aforesaid, a depending stem on the tilting member reaching through said opening, a bellows around the stem and between the tilting member and the floor and surrounding the opening to thereby seal the discharge chamber from the opening, and means for causing the stem to move with a gyratory motion, substantially as described.

5. In a liquid displacement apparatus the combination of means for establishing a discharge chamber, an inlet passage in conjunction with the lower portion of said chamber, three collapsible chambers within the chamber and above the inlet passage, inlet check valves between the passage and said collapsible chambers, means for closing the upper ends of the collapsible chambers, a discharge check valve in each of said closing means permitting discharge of displaced liquid from the collapsible chambers into the space around them and within the discharge chamber, a discharge connection from the top portion of the discharge chamber, and means for moving the upper ends of the collapsible chambers up and down in succession with sinusoidal movements and in cycles of movement timed substantially 120 degrees apart by the application of power from outside of said chamber, substantially as described.

6. In a liquid displacement apparatus the combination of a discharge chamber, an inlet passage in conjunction with the lower portion thereof, three collapsible chambers within the discharge chamber and above said passage, an inlet check valve between the lower end of each collapsible chamber and the inlet passage, means for closing the upper end of each collapsible chamber, a discharge check valve in conjunction with each of said closing means permitting discharge of liquid from the upper ends of the collapsible chambers into the space around them and within the discharge chamber, a delivery connection from the discharge chamber, and means for moving the upper ends of the collapsible chambers up and down in succession with sinusoidal movements and in cycles of movement timed substantially 120 degrees apart by the application of power from beneath the chamber, substantially as described.

7. In a liquid displacement apparatus the combination of means for establishing a discharge chamber, an inlet passage in conjunction with the lower portion thereof, three collapsible chambers within the discharge chamber and above the position of the inlet passage, an inlet check valve between the inlet passage and the lower portion of each of said collapsible chambers, means for sealing the upper ends of the collapsible chambers, a discharge check valve in each of said sealing means permitting discharge of liquid upwards from the collapsible chambers into the space around them and within the discharge chamber, a suitable delivery connection from the discharge chamber, driving means beneath the discharge chamber, and a flexible liquid sealing connection between said driving means and the interior of the discharge chamber establishing a liquid sealing connection to the upper ends of the different collapsible chambers, substantially as described.

8. In a liquid displacement apparatus the combination of means for establishing a discharge chamber, three collapsible chambers within said chamber having their lower ends fixed in position, an inlet passage in conjunction with said lower ends, an inlet check valve between said passage and the lower portion of each collapsible chamber, a discharge check valve at the upper end of each collapsible chamber permitting delivery of liquid from the collapsible chamber into the space around the collapsible chamber and within the discharge chamber, a delivery connection from the top of the discharge chamber, and means for moving the upper portions of the collapsible chambers up and down within the discharge chamber with sinusoidal movements and in cycles of movement timed substantially 120 degrees apart by the application of power from outside of said chamber, substantially as described.

9. In a liquid displacement apparatus the combination of means for establishing a discharge chamber, a plurality of collapsible chambers therein, means for anchoring the lower ends of said collapsible chambers, an inlet passage in conjunction with said lower ends, an inlet check valve between said inlet passage and the lower portion of each collapsible chamber, a discharge check valve in conjunction with the upper portion of each collapsible chamber, a delivery connection from the top of the chamber, and means for moving the upper portions of the collapsible chambers up and down in timed relation and in sequence to ensure a uniform rate of delivery throughout the entire cycle of movement, substantially as described.

10. In a liquid displacement apparatus the combination of means for establishing a discharge chamber, a plurality of collapsible chambers within said chamber, means for anchoring one end of each collapsible chamber, an inlet passage in conjunction with the anchored ends of the collapsible chambers, an inlet check valve between the inlet passage and each collapsible chamber, a discharge check valve in conjunction with the free end of each collapsible chamber permitting discharge of liquid from the collapsible chambers into the space around them and within the discharge chamber, a delivery connection from the top of the discharge chamber, and means for moving the free ends of the collapsible chambers in succession by the application of power from outside of the discharge chamber in timed relation and in sequence to ensure a uniform rate of delivery throughout the entire cycle of movement, substantially as described.

THOMAS A. BANNING, Jr.